April 22, 1969  D. P. KECKLER  3,440,297

SCRUBBING PROCEDURE FOR CRUDE ACETYLENE STREAM

Filed Dec. 14, 1966

INVENTOR
DAVID P. KECKLER

BY John J. Freer
ATTORNEY

United States Patent Office 3,440,297
Patented Apr. 22, 1969

3,440,297
SCRUBBING PROCEDURE FOR CRUDE
ACETYLENE STREAM
David P. Keckler, Lakewood, Ohio, assignor to Diamond
Shamrock Corporation, a corporation of Delaware
Filed Dec. 14, 1966, Ser. No. 601,720
Int. Cl. C10h 23/00
U.S. Cl. 260—679
5 Claims

ABSTRACT OF THE DISCLOSURE

A process improvement in the preparation of acetylene from the pyrolysis product of low boiling hydrocarbons. Conventionally such pyrolysis product can be contacted, for removal of impurities, with a high boiling hydrocarbon scrubbing solvent. Thereafter separation of contaminated solvent can precede preparation of an acetylene-rich gas in a purification system using methanol. The improvement herein is the contacting of scrubbed gas with methanol, during separation of contaminated solvent to prepare a methanol-vapor-containing gas, thus enhancing removal of contaminated scrubbing solvent.

---

This invention relates to an improvement in the removal of impurities from an acetylene containing gas stream and more particularly relates to an improvement in separating from such stream an organic scrubbing solvent employed for removal of at least a portion of such impurities.

In the preparation of acetylene by the pyrolysis of low boiling hydrocarbons the first treatment of the pyrolysis product has conventionally been a water washing of the product for quenching as well as initial removal of impurities, especially soot. Thereafter, or occasionally in lieu of water washing, the acetylene-containing gas stream is contacted with a high boiling organic solvent generally for absorption and separation of high boiling impurities within the gas stream and also for additional soot removal, plus some water removal where water washing has preceded solvent contact. For the efficient removal of high boiling impurities, and for the economical operation of the contacting units as well as subsequent purification operations further downstream, it has been typical to continuously operate the contacting apparatus under conditions suitable for preparing a gaseous effluent having a temperature of about 100° F. and being at a pressure of about atmospheric or slightly superatmospheric.

Heretofore, it has been shown that the resulting gaseous effluent can be treated for removal of contaminated scrubbing solvent carried over from the contacting unit, by treatment of the effluent in a series of steps involving compression with repeated refrigeration and subsequent passage through knockout tanks to remove condensible vapors, such as has been shown in U.S. Patent 2,982,794, but this adds additional processing equipment and can detract from the over-all economy of the system. As an alternative, gaseous effluent from the contacting unit can be contacted with a solvent which is selective for acetylene, thereby substantially separating acetylene from the gaseous effluent without first exercising a high degree of care in the removal of contaminated scrubbing solvent. However, such extraction by selective solvent involves the later separation of acetylene from the extractive solvent and chiefly the use of costly solvent material, thus also detracting from processing economy.

Recently it has been proposed to recover acetylene from acetylene-containing gas by processing, after initial removal of soot, tars and other contaminants, the acetylene-containing gas in a gas purification zone using methanol which scrubs out heavy acetylenes, e.g., methylacetylene and ethylacetylene, with the methanol thereby preparing an acetylene-rich gas. Typically, as has been shown in U.S. Patents 2,894,602 and 2,966,392, these methanol purification systems, for efficient and economical operation, are essentially low temperature operations, e.g., initial maximum operating temperatures of 25° C. or less and subsequently down to about −60° C. and more. To operate such a methanol purification zone downstream from a scrubbing solvent contacting unit, it has been necessary to achieve the removal of preponderantly all scrubbing solvent prior to treatment of the gas in the methanol purification zone. Otherwise scrubbing solvent carried over into the methanol purification zone in sufficient quantity can form oil-water emulsions which interfere with the subsequent stripping of the heavy acetylenes from the acetylene-containing gas. Also, in related methanol recovery apparatus, these emulsions can interfere with the efficient purification of methanol.

It is therefore an object of this invention to provide an improved process for removing scrubbing solvent from an acetylene-containing gas.

Another object of this invention is to provide for extended operation of a low temperature gas purification system using methanol by removal of additional impurities from an acetylene-containing gas prior to such system.

It is still a further object of this invention to provide an improved process for preparing an acetylene-containing gas for subsequent processing in a low temperature gas purification system using methanol without the introduction of foreign organics into the gas purification section.

Other objects will be apparent to those skilled in the art from the description which follows hereinafter.

Accordingly, the above objects are accomplished in a process which includes the steps of contacting an acetylene containing gas, wherein further pyrolytic reaction in such gas has substantially ceased, with high boiling hydrocarbon scrubbing solvent to scrub high boiling aromatic and soot contaminants from the gas, which scrubbing prepares a scrubbed effluent containing contaminated scrubbing solvent, with the effluent being at a pressure of between about 15–90 p.s.i.a. and having a temperature within the range from about 70° and about 150° F., withdrawing contaminated scrubbing solvent contained in the scrubbed effluent in a separation zone whereby an acetylene-containing discharge gas is formed, and contacting the discharge gas with methanol, in a low temperature gas purification zone thereby preparing the acetylene-rich gas, by the improvement in process which comprises: contacting scrubbed effluent within the separation zone with a liquid methanol feed under conditions for vaporizing the liquid methanol, thereby preparing a cooled, methanol-vapor-containing scrubbed effluent and enhancing separation of contaminated scrubbing solvent therefrom.

Figure 1:
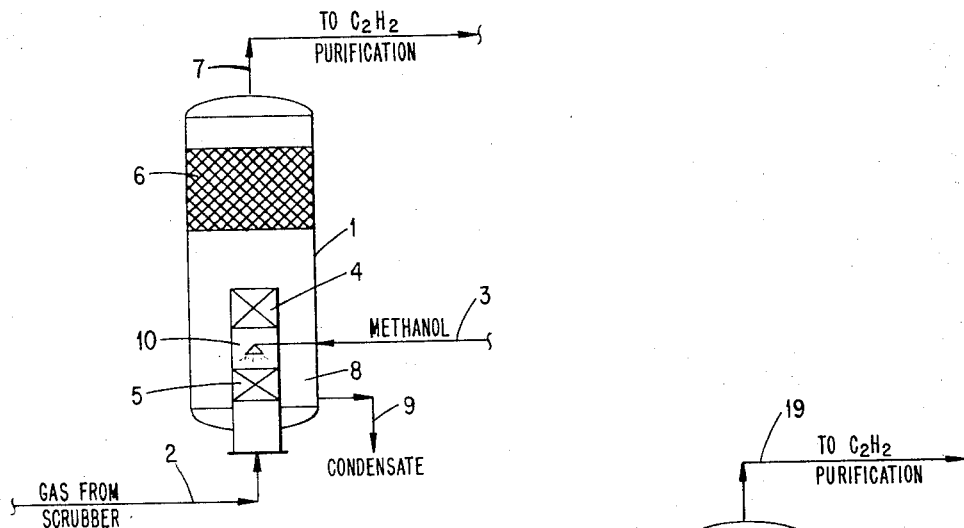
FIG. 1 is a diagrammatic illustration depicting one method of carrying out the improvement of the invention.

Referring to FIG. 1, hot effluent gas, which otherwise could be fed into knockout tanks prior to further downstream treatment in a low temperature gas purification system employing methanol, instead enters the bottom of a column 1 through a hot-gas feed line 2. The hot effluent gas has been contacted with high boiling hydrocarbon solvent in apparatus not shown and contains entrained, contaminated scrubbing solvent. Liquid methanol, feeding from a source not shown, flows through an inlet line 3 into a methanol entry zone 10 of the column 1, which entry zone 10 is located between an upper contacting section 4 and a lower gas entry section 5, both of which sections are housed in the bottom portion of the column 1. The gas discharging from the hot-gas feed line 2 moves upwardly through the gas entry section 5 for subsequent methanol contact. The velocity of the upwardly moving gas prevents substantial flow of methanol down through the gas entry section 5. The upper contacting section 4, e.g., a packed section, provides enhanced contact surface for the gas flowing upwardly from the methanol entry zone 10.

Methanol-vapor-containing gas, i.e., gas containing methanol vapor stripped by contact of the gas with liquid methanol in the methanol entry zone 10 and further in the upper contacting section 4, discharges overhead from the upper contacting section 4. This discharged gas expands and diffuses through demisting apparatus 6, i.e., entrainment separation apparatus, situated in the upper expanded area of the column 1. Cooled and stripped gases discharging overhead from the top of the demisting apparatus 6 pass through an overhead line 7 for subsequent processing in a low temperature gas purification system employing methanol, not shown. Condensate flowing downwardly from the bottom of the demisting apparatus 6 proceeds on down into the condensate accumulation and removal zone 8 at the bottom of the column 1 for subsequent removal from the column 1 through the bottoms draw-off line 9 to collection and/or separation means not shown.

Figure 2:
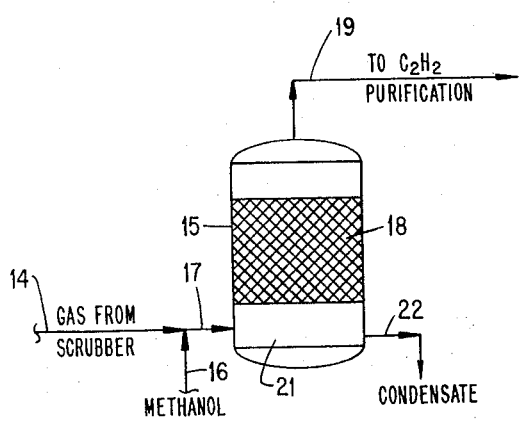
FIG. 2 is another diagrammatic illustration showing an alternate method of carrying out the improvement taught herein.

In FIG. 2, hot effluent gas flows from scrubbing solvent contacting apparatus, not shown, through a hot-gas line 14 equipped with a methanol inlet line 16. Liquid methanol fed from a source not shown flows through the inlet line 16 and discharges, e.g., through spray nozzles into the hot scrubbing effluent for vaporization therein. The resulting cooled, methanol-vapor-containing gaseous mixture passes through an inlet gas line 17 into a column 15 in the region below demisting apparatus 18 housed within the column 15. Cooled gas from the inlet gas line 17 flows up through the demisting apparatus 18 and stripped gas discharges overhead from the demisting apparatus 18 through a gas discharge line 19 to a methanol-containing, gas purification section, not shown. Condensate flowing downwardly from the demisting apparatus 18 joins unvaporized methanol, if present, entering through the inlet gas line 17, and the total condensate is collected in the condensate accumulation and removal section 21 of the column 15. Collected condensate is removed from the column 15 through the bottoms draw-off line 22 to collection and/or separation means not shown.

Figure 3:
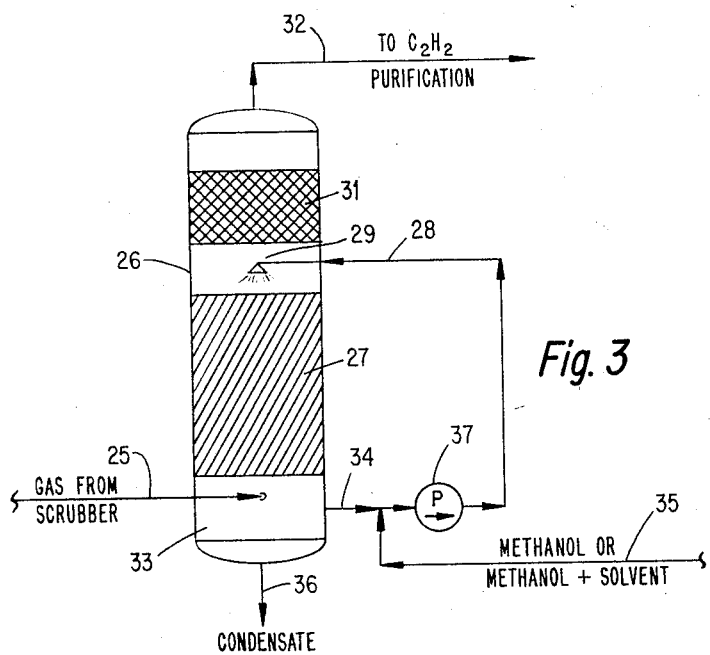
FIG. 3 is a further diagrammatic illustration showing still another method of performing the improvement of this invention.

In FIG. 3 hot effluent gas, ready for passage to the final contacting stage of a multi-stage scrubbing solvent contacting apparatus, flows from initial contacting apparatus, not shown, through an inlet line 25 into a column 26 in the region below contacting apparatus 27 housed within the column 26. Liquid methanol plus scrubbing solvent, flows through a feed inlet 28 into a liquid inlet zone 29 contained within the column 26 which liquid inlet zone 29 is located above the contacting apparatus 27. Hot gaseous material flowing upwardly through the contacting apparatus 27 contacts liquid methanol plus scrubbing solvent flowing downwardly through such contacting apparatus 27. Within such contacting apparatus 27 the gaseous material strips methanol from the entering scrubbing solvent-methanol mixture. The resulting cooled, methanol-vapor-containing gaseous mixture flowing upwardly from the contacting apparatus 27 through the liquid inlet zone 29 passes into demisting apparatus 31 housed within the column 26. Stripped gas discharging overhead from the demisting apparatus 31 flows from the column 26 through an overhead line 32 to a methanol-containing, gas purification zone not shown.

Condensate traveling downwardly from the demisting apparatus 31, which condensate comprises liquid methanol, e.g., derived from entrained methanol, if any, entering the demisting apparatus 31 from the liquid inlet zone 29, plus condensed, contaminated scrubbing solvent with such liquid methanol, continues in substantial amount down through the liquid inlet zone 29 and into the contacting apparatus 27. Bottoms condensate, i.e., comprising scrubbing solvent plus methanol, flowing down from the contacting apparatus 27 collects in the condensate accumulation section 33. From this accumulation section 33, bottoms condensate can be drawn off through a recycle draw-off line 34 and recycled, e.g., by means of a pump 37, through the methanol plus scrubbing solvent feed inlet 28 to the liquid inlet zone 29. Accumulated bottoms condensate can also be drawn off from the condensate accumulation section 33 through a bottoms draw-off line 36 for collection of condensate, or collection plus subsequent separation of some to substantially all of the condensate components, by means not shown. Fresh methanol plus scrubbing solvent is fed through a make-up line 35, from a source not shown, into the recycle draw-off line 34 to replace methanol plus scrubbing solvent removed from the system through the bottoms draw-off line 36 as well as vapor losses, which are essentially methanol vapor losses, in the stripped gas leaving the column 26 through the overhead line 32.

The high boiling hydrocarbon scrubbing solvent is typically one having an initial boiling point of at least about 200° F. and a final boiling point not substantially above about 700° F. These solvents can be predominantly aromatic or aliphatic or mixtures of same and can have narrow boiling point ranges, e.g., of about 100° F. from inception of boiling to essentially the final boiling point. An exemplary hydrocarbon scrubbing solvent is one disclosed in U.S. Patent 2,982,794, which is a heavy aromatic oil having a specific gravity at 60/60° F. of 1.0655 and an ASTM distillation, corrected to 760 mm. Hg, of 5 weight percent at 413° F. and 50 weight percent at 558° F.

The amount of methanol which is fed into the scrubbed effluent will depend upon the scrubbing solvent contained in the effluent and the particular scrubbing solvent employed. Typically, however, about 0.5–6 gallons of methanol is used per 1,000 moles of scrubbed effluent to provide for a significant enhancement in the removal of scrubbing solvent, although upwards to about 10 gallons of methanol per 1,000 moles of scrubbed effluent gas can often be used, particularly since methanol leaving the separation column overhead from the demisting section is recovered in a subsequent gas purification system employing methanol. Also, where the liquid methanol feed contains a minor or greater amount of scrubbing solvent, the methanol portion of the feed should be escalated to compensate for the additional scrubbing solvent thus entering the column.

Generally, the scrubbing solvent contacting apparatus operates so that the effluent leaving such apparatus is at a pressure of about 15 p.s.i.a. or slightly thereabove, but for efficient and economical operation, not above about 90 p.s.i.a., while the temperature for such effluent is within the range of from about 70° to about 150° F. The enhanced removal of scrubbing solvent disclosed herein within these pressure and temperature ranges, can typically be accompanied during the methanol vaporization by a temperature reduction for the acetylene-containing gas stream of about 15°–45° F. For enhancing such a temperature reduction, the feed rate of methanol into the contacting column can be escalated up to substantially the methanol vapor capacity of the cooled-methanol-vapor-containing gas.

Referring again to FIG. 2, gas which has been contacted with an organic hydrocarbon solvent consisting of a mixture of aliphatic, aromatic and naphthalene solvents, which mixture boils within the range from about 325°–650° F., flows through the hot-gas line 14. In this line 14 the gas is at a pressure of approximately 50 p.s.i.a. and a temperature of about 90° F. Before discharging into the stripping column 15, the gas is spray-contacted with liquid methanol from the inlet line 16, which methanol is at a temperature of approximately 76° F., and is flowing at a rate of 2.3 gallons of methanol per 1,000 moles of gas flowing through the hot-gas line 14. The resulting methanol-vapor-containing gas mixture enters the bottom portion of the column 15 at a temperature of about 60° F.

The condensate passing from the bottom of the column 15 through the bottoms draw-off line 22 at a temperature of about 60° F. consists of about 66–69 percent of the hydrocarbon scrubbing solvent entering the column 15 from the inlet gas line 17. Additionally the condensate contains about 60 weight percent of water vapor carried over from an upstream water quench system and entering the column 15 with the inlet gas. Visual inspection of the condensate further shows that some carbonaceous solids are removed with the condensate although the inlet gas had been previously subjected to water quenching and hydrocarbon solvent scrubbing.

The condensate removed from the column can be passed, for example, to a decanting vessel for settling into a scrubbing solvent phase and separate aqueous phase, with the methanol being concentrated in the aqueous phase. Subsequently, methanol can be recovered by fractional distillation of the material drawn off from the aqueous phase. The recovered methanol can be combined with fresh methanol, which fresh methanol is used as make up for any methanol losses, e.g., occurring when methanol vapor is carried overhead from the demisting apparatus, and the combination used as the methanol feed into the scrubbing effluent. Scrubbing solvent recovered from the scrubbing solvent phase can be recycled to the scrubbing solvent contacting apparatus. Generally in such operation over about 90 weight percent of the methanol, from the condensate removed from the column, can be subsequently recovered, for recycle.

While certain representative embodiments and details have been shown for the purpose of illustrating the invention, it will be apparent to those skilled in the art that various changes and modifications may be made therein without departing from the spirit or the scope of the invention.

What is claimed is:
1. In a process for preparing an acetylene-rich gas from the prolysis product of low boiling hydrocarbons wherein further pyrolytic reaction within said product has substantially ceased, which process then comprises contacting resulting acetylene-containing gas with high boiling hydrocarbon scrubbing solvent whereby high boiling aromatic and soot contaminants are scrubbed from said gas, and whereby a scrubbed effluent containing contaminated scrubbing solvent is formed, said scrubbed effluent being at a pressure of between about 15–90 p.s.i.a. and having a temperature within the range from about 70° and about 150° F., withdrawing contaminated scrubbing solvent contained in said scrubbed effluent in a separation zone whereby an acetylene-containing discharge gas is formed, and contacting said discharge gas with methanol in a low temperature gas purification zone thereby preparing said acetylene-rich gas, the improvement in process which comprises: contacting scrubbed effluent within said separation zone with a liquid methanol feed, under conditions for vaporizing said liquid methanol, up to substantially the methanol vapor capacity of resulting cooled, methanol-vapor-containing scrubbed effluent, thereby preparing said cooled, methanol-vapor-containing scrubbed effluent and enhancing separation of contaminated scrubbing solvent therefrom.

2. The process of claim 1 wherein entrained methanol together with condensed, contaminated scrubbing solvent vapor are simultaneously separated from said cooled, methanol-vapor-containing scrubbed effluent.

3. The process of claim 2 wherein methanol separated with the contaminated scrubbing solvent is recovered for recycling to said separation zone.

4. The process of claim 1 wherein said scrubbed effluent is contacted within said separation zone with a feed of between about 0.5–10 gallons of liquid methanol for each 1,000 moles of said scrubbed effluent.

5. The process of claim 1 wherein said liquid methanol feed contains scrubbing solvent.

References Cited

UNITED STATES PATENTS 2,894,602  7/1959  Fauser.
2,982,794  5/1961  Davison _____ 260—679

DELBERT E. GANTZ, *Primary Examiner.*

J. D. MYERS, *Assistant Examiner.*